(12) United States Patent
Kagotani et al.

(10) Patent No.: US 11,741,327 B2
(45) Date of Patent: Aug. 29, 2023

(54) OPTICAL ASSEMBLY AND METHOD OF PRODUCING OPTICAL ASSEMBLY

(71) Applicant: TOPPAN INC., Tokyo (JP)

(72) Inventors: Akihito Kagotani, Tokyo (JP); Satoshi Uchida, Tokyo (JP); Soko Koda, Tokyo (JP)

(73) Assignee: TOPPAN INC., Tokyo (JP)

( * ) Notice: Subject to any disclaimer, the term of this patent is extended or adjusted under 35 U.S.C. 154(b) by 26 days.

(21) Appl. No.: 17/580,182

(22) Filed: Jan. 20, 2022

(65) Prior Publication Data

US 2022/0147780 A1    May 12, 2022

Related U.S. Application Data

(63) Continuation of application No. PCT/JP2020/028263, filed on Jul. 21, 2020.

(30) Foreign Application Priority Data

Jul. 23, 2019  (JP) .................................. 2019-135278

(51) Int. Cl.
*G06K 19/06*  (2006.01)
*G02B 5/02*  (2006.01)
*G07D 7/0043*  (2016.01)

(52) U.S. Cl.
CPC ..... *G06K 19/06028* (2013.01); *G02B 5/0284* (2013.01); *G07D 7/0043* (2017.05)

(58) Field of Classification Search
CPC ........... G06K 19/06028; G02B 5/0284; G07D 7/0043

(Continued)

(56) References Cited

U.S. PATENT DOCUMENTS

2011/0134745 A1   6/2011  Matsuda et al.
2013/0042966 A1*  2/2013  Look .................... B60R 13/105
                                           156/227

FOREIGN PATENT DOCUMENTS

EP   3 508 350 A1   7/2019
JP   2004-341146 A   12/2004
(Continued)

OTHER PUBLICATIONS

International Searching Authority, "International Search Report," issued in connection with International Patent Application No. PCT/JP2020/028263, dated Oct. 27, 2020, 6 pages.

(Continued)

*Primary Examiner* — Daniel A Hess
(74) *Attorney, Agent, or Firm* — Foley & Lardner LLP

(57) ABSTRACT

An optical assembly includes a spacer layer which is translucent or transparent; an image forming reflector which has a reflective layer being formed at least in a first region of the spacer layer; and a protective layer which is laminated over the spacer layer and the image forming reflector and the protective layer being translucent or transparent. The spacer layer is made of a polyolefin or/and a polymer containing an aryl group. The image forming reflector includes a visible image which is authenticatable. The image forming reflector has an individual information record in which a code is stored in the form of a plurality of removed linear segments. The image forming reflector has white level regions and a black level region in planar view. Each of the white level regions has the removed linear segments formed therein. The black level region is interposed between the white level regions.

10 Claims, 6 Drawing Sheets

(58) Field of Classification Search
USPC .......................................................... 235/380
See application file for complete search history.

(56) References Cited

FOREIGN PATENT DOCUMENTS

| | | |
|---|---|---|
| JP | 2005-158115 A | 6/2005 |
| JP | 2010-049736 A | 3/2010 |
| JP | 2015-024650 A | 2/2015 |
| JP | 2019-40363 A | 3/2019 |

OTHER PUBLICATIONS

International Searching Authority, "Written Opinion," issued in connection with International Patent Application No. PCT/JP2020/028263, dated Oct. 27, 2020, 4 pages.
Extended European Search Report, dated Aug. 3, 2022, issued in corresponding European Patent Application No. EP20844339.
Office Action issued in corresponding Chinese Patent Application No. 202080050722.1, dated Feb. 3, 2023.

\* cited by examiner

OPTICAL ASSEMBLY AND METHOD OF PRODUCING OPTICAL ASSEMBLY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/028263, filed on Jul. 21, 2020, which is based upon and claims the benefit of priority to Japanese Patent Application No. 2019-135278, filed on Jul. 23, 2019; the disclosures of which are incorporated herein by reference in their entireties.

TECHNICAL FIELD

Embodiments of the present invention generally relate to an optical assembly and a method of producing the same. A printed matter provided with the optical assembly will also be further described.

BACKGROUND

In recent years, there have been an increase in the used of codes such as two-dimensional codes and barcodes recorded on various objects such as securities, card media, passports, visas, banknotes, and transportation items, which are then read by machines to digitally manage the objects (for example, refer to PTL 1). Identification by smartphones using two-dimensional codes is also becoming more popular.

It is necessary to strictly manage not only codes but also personal data such as biometric identifiers and identification data. It is necessary to perform on-demand recording and management of facial images or fingerprint information for biometric identifiers, and names and dates of birth for identification data.

If decorations, patterns, graphic information, and the like can be formed on various objects, the convenience of use of securities, card media, passports, visas, banknotes, and transportation items will be improved.

[Citation List] [Patent Literature] [PTL 1] JP-2019-40363 A

SUMMARY OF THE INVENTION

Technical Problem

While two-dimensional codes and barcodes are highly convenient since anyone can easily print them with a printer, counterfeits can be easily manufactured using this advantage. Since counterfeit codes are printed in black and white on white paper, their appearance is almost the same as that of genuine products, and thus it is sometimes difficult to determine whether they are counterfeits or not.

Another problem is black and white codes do not look good in design. A black and white code has two-tone color consisting of a white region with high reflectance and a black region with low reflectance for reducing machine reading errors. Therefore, it is difficult to improve the appearance of the code, because adding other elements to improve the appearance may increase the occurrence of machine reading errors.

In view of the above circumstances, it is an object of the present invention to provide an optical assembly capable of forming a code that is difficult to counterfeit and has high readability and aesthetic qualities.

Solution to Problem

An optical assembly according to a first aspect of the present invention includes: a spacer layer which is translucent or transparent; an image forming reflector which has a reflective layer formed at least in a first region of the spacer layer; and a protective layer which is translucent or transparent and is laminated over the spacer layer and the image forming reflector. The spacer layer is made of a polyolefin or/and a polymer containing an aryl group. The image forming reflector has a visible image formed therein and the visible image is authenticatable. The image forming reflector has an individual information record in which a code is stored in the form of a plurality of removed linear segments. The removed linear segments are formed by removing parts of the reflective layer. The image forming reflector has white level regions and a black level region in planar view of the image forming reflector. Each of the white level regions has the removed linear segments formed therein. The black level region is interposed between the white level regions.

A method of producing an optical assembly according to a second aspect of the present invention includes: preparing a pre-assembly; emitting a first laser beam onto the image forming reflector to remove portions of the image forming reflector in the form of a plurality of removed linear segments which define an identifier including a machine-readable code; and emitting a second laser beam onto the spacer layer to laser mark the spacer layer. The pre-assembly includes: a reflective scattering layer which diffuses light incident thereto; a spacer layer which is formed on the reflective scattering layer and is made of a polyolefin or/and a polymer containing an aryl group; an image forming reflector which is formed at least in a first region of the spacer layer; and a protective layer which is laminated over the spacer layer and the image forming reflector. The identifier has white level regions and a black level region in planar view of the identifier. Each of the white level regions has the removed linear segments formed therein. The black level region is interposed between the white level regions. The image forming reflector includes a visible image which is authenticatable.

Effect of the Invention

In the optical assembly of the present invention and the method of producing the optical assembly, it is possible to form a code that is difficult to counterfeit and that has both high readability and aesthetic qualities.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention from the background. Aspects of the present invention are those of the group of embodiments based on the single invention. Configurations of the present invention can include the aspects of the present invention. Features of the present invention can be combined to form the configurations. Thus, the features, configurations, aspects and embodiments of the present invention can be combined, and the combinations each have synergistic functions and can exert synergistic effects.

First Embodiment

A first embodiment of the present invention will be described below with reference to FIGS. 1 to 8.

Figure 1:
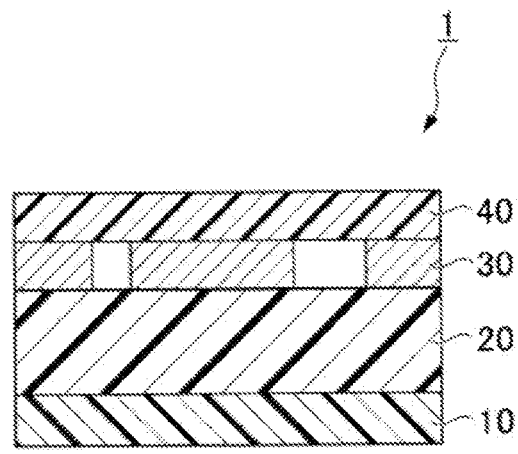
FIG. 1 is a diagram schematically illustrating an assembly of an optical assembly according to a first embodiment of the present invention.

FIG. 1 is a diagram schematically illustrating an assembly of an optical assembly 1 of the first embodiment. The optical assembly 1 includes a spacer layer 20, an image forming reflector 30, and a protective layer 40 in this order. The image forming reflector 30 is a layer interposed between the spacer layer 20 and the protective layer 40.

(Definition of Directions)

In the first embodiment, the direction in which the spacer layer 20, the image forming reflector 30, and the protective layer 40 are laminated is referred to as a thickness direction. A region near the spacer layer 20 where the image forming reflector 30 and the protective layer 40 are disposed will be referred to as an upper side in FIG. 1. A region on the opposite side of the upper side will be referred to as a lower side in FIG. 1. Further, viewing from the thickness direction is called a planar view, and viewing from a cross section along the thickness direction is called a cross-sectional view.

The optical assembly 1 may have an embossed layer (not shown, also referred to as a relief layer) arranged between the image forming reflector 30 and the protective layer 40. The embossed layer has a concavo-convex structure (relief structure) which will be described in detail below.

The image forming reflector 30 has a visible image formed therein. The authenticity of the optical assembly 1 can be visually verified using the formed image. The image formed in the image forming reflector 30 can be authenticated.

The image forming reflector 30 has a reflective layer. The image forming reflector 30 may be formed of a reflective layer. The image forming reflector 30 may be formed of two reflective layers. These two reflective layers may be in direct contact with each other, or may be laminated via a resin. When the image forming reflector 30 is formed of two reflective layers, images different from each other are each formed on the two reflective layers. Thus, the optical assembly 1 having different images on the front and back is formed.

A reflective scattering layer (also called a visualization object) 10 may be formed on a surface of the spacer layer 20 facing away from the surface where the image forming reflector 30 is disposed. A reflective scattering layer 10 may be, for example, a scattering reflector and a fluorescent reflective sheet. When the reflective scattering layer 10 is a scattering reflector or a fluorescent reflective sheet, an image recorded in the image forming reflector 30 can be observed as reflected light. The reflective scattering layer may be replaced with a surface light source such as a fluorescent sheet. When a surface light source or a fluorescent sheet is used, an image recorded in the image forming reflector 30 is observed as transmitted light.

The scattering reflector may be, for example, a plastic sheet in which inorganic pigments are dispersed. The scattering reflector may be a printed matter. When the scattering reflector is a printed matter, the integrated pattern of the print and the image forming reflector 30 is displayed. Examples of integrated pattern include a line latent image and a moiré pattern. The scattering reflector may be a white plastic sheet attached to the lower surface of the spacer layer 20. The scattering reflector may also be replaced with white paper.

The fluorescent reflective sheet may be, for example, a plastic sheet containing a fluorescent dye or a plastic sheet using a plastic having a fluorescent molecular structure as a base material. The plastic sheet may be replaced with white paper containing a fluorescent agent.

The surface light source may be, for example, illumination having a point light source and a diffusion panel, illumination having a point light source and a waveguide plate, or OLED (Organic Light Emitting Diode) illumination.

The fluorescent sheet may be, for example, a plastic sheet containing a fluorescent agent, or a plastic sheet coated with a fluorescent ink. The fluorescent agent may be a fluorescent dye or a fluorescent pigment. The fluorescent ink may be a mixture of one or both of a dye ink and a pigment ink, and a medium.

A relief structure (not shown) may be formed on a surface of the protective layer 40 facing the image forming reflector 30. The surface having the relief structure is a relief surface.

The relief structure of the protective layer 40 or the relief structure of the embossed layer is formed by concave portions and convex portions. The relief structure may be formed by transferring (embossing) a concavo-convex shape formed on the surface of a metal stamper to an object.

The relief structure has optical effects such as an optical diffraction effect, an antireflection effect, an isotropic or anisotropic scattering effect, a lens effect, and a polarization selective reflection effect. This optical effect enables the authenticity to be verified visually. Specifically, the relief structure is visible. The relief structure is visually authenticatable. The image forming reflector 30 on the relief surface having the relief structure is also visible and authenticatable. In other words, the image forming reflector 30 on the relief surface having the relief structure is also visible and authenticatable. Thus, the effect of preventing counterfeiting and tampering is exhibited. The optical effect also provides a good aesthetic appearance. This optical effect allows the optical assembly to provide a visual effect.

The desired optical effect may be obtained by combining regions having one or more optical effects. The regions having one or more optical effects may be arranged in contact with each other, adjacent to each other, close to each other, at regular intervals, or alternately. The relief surface having a relief region having a plurality of optical effects can exhibit complex visual effects, and thus is effective in preventing counterfeiting and tampering. Also, the aesthetic appearance of the optical assembly 1 is enhanced.

The relief structure has concave portions and convex portions, and imparts to the optical assembly 1 optical properties such as diffraction, light reflection suppression, isotropic or anisotropic light scattering, refraction, polarization and wavelength selective reflection, transmission, and light reflection suppression.

As a relief structure, for example, a diffraction grating structure region may be provided at a pitch of 0.5 μm or more and 2 μm or less, and at a depth of 0.05 μm or more and 0.5 μm or less. This relief structure imparts the property of diffracting light to the optical assembly 1.

As a relief structure, for example, a moth-eye structure or a deep lattice structure may be provided at a pitch of 0.1 μm or more and 0.5 μm or less, and at a depth of 0.25 μm or more and 0.75 μm or less. The relief structure imparts to the optical assembly 1 light reflection suppression properties, polarization and wavelength selective reflection properties, transmission properties, and light reflection suppression properties.

As a relief structure, for example, a region of a non-periodic linear structure or dot-like repetitive structure may be provided at an average pitch of 0.5 μm or more and 3 μm or less, and at a depth of 0.05 μm or more and 0.5 μm or less. This relief structure imparts the property of emitting isotropic or anisotropic scattered light to the optical assembly 1.

As a relief structure, a region of a structure having an average pitch larger than 3 μm and a depth deeper than 0.5 μm may be provided. This relief structure causes the adjacent layers to have refractive indices different from each other, and imparts the refractive properties to the optical assembly 1.

The relief structure may also include a relief surface (recording surface) as described below, which is disclosed in PCT/JP2017/020049 (International Publication WO 2017/209113 A1).

As an example, the relief surface of the first embodiment has a phase angle recording region and a phase angle non-recording region. In the relief surface, a region other than the phase angle recording region is a phase angle non-recording region. An example of the phase angle non-recording region is a mirror surface.

The positional relationship between each configuration will be described using the XYZ rectangular coordinate system. The relief surface is arranged along the XY plane.

When light is incident from a direction intersecting the relief surface, the incident light will be modulated by the relief surface and thus a reconstruction image can be obtained. The reconstruction image is an image of a plurality of reconstruction points. The reconstruction points are obtained at a distance in the Z direction from the relief surface. When viewing the relief surface from a target reconstruction point, the range in which the reconstruction image is reproduced in the viewing angle direction is termed as a viewing angle θ. In the following description, the viewing angle direction is termed as the X direction or the Y direction.

In the relief structure, respective calculated element regions are defined according to the viewing angle θ from respective reconstruction points where the reconstruction image is reproduced. As described above, since the calculated element regions are defined independently of the phase angle recording region and the phase angle non-recording region, they are usually individually overlapped with the phase angle recording region and the phase angle non-recording region.

There are a plurality of reconstruction points. Accordingly, the calculated element regions and reconstruction points are present on a one-to-one basis, and the number of the calculated element regions is the same as the number of the reconstruction points.

The reproduction points are arranged separated from the relief surface. The distance from the relief surface to the reconstruction point in the Z direction is preferably 5 mm or more and 25 mm or less. The reconstruction point may be reproduced from the relief surface toward the observer or from the relief surface toward the opposite side of the observer. In either case, the distance of the reconstruction point from the relief surface can be the same.

The viewing angle θ from the reconstruction point is defined by the following equation (1).

$$\theta < (A/m) \tag{1}$$

In the relationship, when $(\lambda/2d) \leq 1$, $A = a\sin(\lambda/2d)$, λ is a wavelength of light, d indicates an arrangement interval in a viewing angle direction of unit blocks, and m is a real number of 3 or more. The wavelength λ of the light can be specifically 555 nm, which corresponds to the maximum specific visual sensitivity of a human, in visible light. The arrangement interval d may be a distance between the centers of the unit blocks. The arrangement interval between the centers of the unit blocks may be 10 nm or more and 200 nm or less.

The viewing angle θ is determined by the range in the X direction when the relief surface is viewed from the target reconstruction point, and is ½ of the angle 2θ formed by the minimum value Xmin in the X direction, the target reconstruction point, and the maximum value Xmax in the X direction. The X direction and the Y direction correspond to the X and Y coordinate axes of Euclidean coordinates, respectively, with the X direction as the direction in which the relief surface extends and the Y direction as the direction orthogonal to the X direction.

When the viewing angle direction is the Y direction, the viewing angle θ is also defined in the same manner as above. The viewing angle θ is determined by the range of the relief surface in the Y direction when the relief surface is viewed from the target reconstruction point, and is ½ of the angle 2θ formed by the minimum value Ymin in the Y direction, the target reconstruction point, and the maximum value Ymax in the Y direction. Therefore, the arrangement interval d between the unit blocks corresponds to an arrangement interval dx in the X direction between the unit blocks when the viewing angle direction is the X direction, or corresponds to an arrangement interval dy in the Y direction between the unit blocks 12 when the viewing angle direction is the Y direction.

The calculated element region is generally square or rectangular. However, the calculated element region may be a polygon other than a square, a circle, or an ellipse. In addition to squares and rectangles, hexagons are also suitable for polygons. If the calculated element region is other than square or rectangular, the minimum value (lower limit) in the X direction of the calculated element region is Xmin, and the maximum value (upper limit) in the X direction of the calculated element region is Xmax. The minimum value in the Y direction of the calculated element region is Ymin, and the maximum value in the Y direction of the calculated element region 16 is Ymax.

If the unit block has a square or rectangular shape, the square or rectangle actually has rounded corners. The unit blocks may be combined with the respective adjacent unit blocks. In this case, even if the shape of each unit block is a rounded square, the combined shape of the unit blocks is different and will not be a rounded square, but even if the shape is changed by this combination, the optical effect will not change. The unit blocks are preferably arranged in an orderly manner. The orderly arrangement may be an arrangement with a fixed range of intervals or an arrangement with equal intervals. A typical orderly arrangement is a square or hexagonal arrangement.

As can be seen from the above equation (1), the viewing angle θ is less than A. If the light passes through this phase component and is diffracted, theoretically no diffraction beyond A occurs. When hologram calculation is performed using a computer, the calculation range may be limited with the viewing angle θ as an upper limit. Limiting the calculation range enables the calculation time to be reduced. Even if the calculation is performed for the range beyond the viewing angle θ, the result only contributes as noise since the calculation is performed for diffraction which does not theoretically exist. However, since the above calculation is not performed for the range beyond the viewing angle θ, noise is prevented from being superimposed on the reconstruction point when reproducing a reconstruction image thereon.

Each of the phase angle recording region and the phase angle non-recording region includes a plurality of unit blocks. Of the phase angle recording region, a computer calculates a phase angle based on the phase component for the unit blocks included in the region overlapping the calculated element region (overlapping region) in the phase angle recording region. Then, the calculated phase angle is recorded in the corresponding unit blocks which are contained in the overlapping region.

The relief surface of the first embodiment is visible and authenticatable. When the optical assembly 1 having the relief surface as the relief structure is tilted by a certain degree or more, and observed from outside the range of the above viewing angle θ, the reconstruction image disappears due to the relief structure. Alternatively, when the visible image formed in the image forming reflector 30 is a barcode, a barcode reader can read the barcode even under this observation condition (outside the range of the viewing angle θ).

The reconstruction image is reproduced only with a point light source. Under diffuse lighting conditions, the reconstruction image disappears. Alternatively, the barcode can be read by the barcode reader even under the observation condition (outside the range of the viewing angle θ).

The viewing angle θ is preferably 5 degrees or more from the viewpoint of visibility of the reconstruction image, and is preferably 15 degrees or less from the viewpoint of facilitating the disappearance of the reconstruction point.

The optical properties of the optical assembly 1 are perceived and sensed by visual inspection. This improves anti-counterfeiting and anti-tampering performance, and aesthetic appearance of the optical assembly 1. The relief structure described above may have a plurality of relief structure regions. A single image or integrated images can be displayed in the relief structure region. The image may be a single or combination of a portrait, landmark motif, art, natural motif, geometric pattern, sign, symbol, emblem, crest, or text. The symbols and emblems may be flags, shields, swords, spears, crowns, stars, moons, hearts, logos, ribbons, lines, flowers, leaves, cereal grains, fruits, birds, wings, fish, arthropods, mammals, reptiles, amphibians, legendary creatures, mythological gods, or mythological goddesses. The landmark motifs may be heritage sites, archaeological sites, historical buildings, mountains, valleys, rocks, or monuments. The natural motifs may be living things, stars, moon, sky, mountains, valleys, or rocks. The living things may be flowers, leaves, cereal grains, fruits, birds, wings, fish, arthropods, mammals, reptiles, or amphibians. The legendary creatures may be unicorns, dragons, or phoenixes. These motifs may represent symbols. The symbol represents a country, region, state, group, council, treaty, alliance, union, or axis.

The protective layer 40 may be, for example, a layer containing a thermoplastic resin and a surface modifier. The thermoplastic resin of the protective layer 40 may be a resin having a glass transition temperature of 90° C. or more and 130° C. or less. The thermoplastic resin may be any one of an acrylic resin, a polyester resin and a polyamide resin, a copolymer resin of any of the above, a composite resin of any of the above, or a composite resin of any of the copolymer resins. The surface modifier may be powder, wax, or oil. The powder may be a heat-resistant powder. The heat-resistant powder can be silica powder, polyethylene powder, fluorine powder, or silicone powder. The wax may be paraffin wax, silicone, or carnauba wax. The oil may be silicone oil.

The embossed layer (not shown) has a relief structure on at least one side of its surface. The embossed layer is formed of, for example, an ultraviolet-curing resin, a thermoplastic resin or a thermosetting resin. The ultraviolet-curing resin may be a curing resin, such as a monomer, an oligomer, or a polymer having an ethylenically unsaturated bond or ethylenically unsaturated groups. The monomer having an ethylenically unsaturated bond or an ethylenically unsaturated group may be 1,6-hexanediol, neopentyl glycol diacrylate, trimethylolpropane triacrylate, pentaerythritol triacrylate, pentaerythritol tetraacrylate, dipentaerythritol pentaacrylate, or dipentaerythritol hexaacrylate. The oligomer having an ethylenically unsaturated bond or an ethylenically unsaturated group may be an oligomer or a co-oligomer of epoxy acrylate, urethane acrylate, or polyester acrylate. The polymer may be a polymer or copolymer of a urethane-modified acrylic or an epoxy-modified acrylic. The ultraviolet-curing resin may be any one of acrylic resin, acrylic acrylate resin, epoxy acrylate resin, urethane acrylate resin, polyester acrylate resin, and ethylene methacrylate resin, a copolymer resin of any of the above, a composite resin of any of the above, or a composite resin of any of the copolymer resins. The embossed layer may have a thickness of 1 μm or more and 25 μm or less.

When a thermoplastic resin is used as the material of the embossed layer, it may be any one of an acrylic resin, an epoxy resin, a cellulose resin, and a vinyl resin, a copolymer resin of any of the above, a composite resin of any of the above, or a composite resin of any of the copolymer resins. The thermosetting resin of the embossed layer may be any one of a urethane resin, a melamine resin, an epoxy resin, a phenol resin, a copolymer resin of any of the above, a composite resin of any of the above, or a composite resin of any of the copolymer resins. The same material may be applied to the protective layer.

The embossed layer may be colored. The resin of the embossed layer may be colored by adding a pigment or a dye. The pigment may be an inorganic pigment or an organic pigment. The pigment may also be a fluorescent pigment, a pearl pigment or a magnetic pigment. The dye may be a natural dye or a synthetic pigment. The dye may also be a fluorescent dye.

The optical assembly 1 may have a translucent layer between each of the layers that constitute the optical assembly 1. The light transmissive layer between each of the layers may be an adhesive layer that adheres the layers on both sides of the layer.

The reflective scattering layer 10 diffuses the visible light incident thereto. The reflective scattering layer 10 may be a white resin layer. Examples of the materials for the reflective scattering layer 10 include thermoplastic resins, such as urethane resin, polycarbonate resin, polystyrene resin, and polyvinyl chloride resin; thermosetting resins, such as unsaturated polyester resin, melamine resin, epoxy resin, urethane (meth)acrylate, polyester (meth)acrylate, epoxy (meth)acrylate, polyol (meth)acrylate, melamine (meth) acrylate, and triazine (meth)acrylate; mixtures thereof; thermoforming materials having a radically polymerizable unsaturated group; and the like. The reflective scattering layer 10 made of polycarbonate has high heat resistance and can prevent discoloration by laser engraving.

The reflective scattering layer 10 can also be formed by placing a layer of light-impermeable reflective ink on a sheet-like base material. The reflective ink is a functional ink whose color changes according to an illumination angle or an observation angle. Examples of the functional ink include Optical Variable Ink, a color shift ink, and a pearl ink. For this configuration, the base material may be transparent.

The spacer layer 20 may be translucent or transparent. The required translucency or transparency of the spacer layer 20 may be set at a level where the light incident from the protective layer 40 reaches the reflective scattering layer 10 and the light reflected by the reflective scattering layer 10 can be transmitted. The spacer layer 20 may be colored. The spacer layer 20 may be a layer that transmits visible and infrared laser beams.

The spacer layer 20 may be configured to be able to write a visible code thereon with a laser. The material of the spacer layer 20 may be polycarbonate or polyester, which are resistant to heat during laser writing. A material having some light scattering properties can also be used for the spacer layer 20. For this case, the transmittance is 40% or more, preferably 60% or more, in the visible range of wavelengths from 380 nm to 780 nm. Generally, the transmittance of the laser beam at a wavelength of 1064 nm is preferably 30% or more.

The spacer layer 20 may be made of a polyolefin or/and a polymer containing an aryl group. The polyolefin or/and the polymer containing an aryl group is a translucent or transparent polymer.

The polymer containing an aryl group may be polycarbonate or polyester terephthalate. The polyolefin may be either polyethylene or polypropylene, a modified product thereof, or a copolymer thereof.

Since a polyolefin has a simple main-chain structure and is thermally stable, it undergoes little chemical change with laser beams below a certain energy level. Thus, discoloration of the spacer layer 20 is less likely to be caused even when the laser beam having energy for removing the reflective layer is irradiated. Further, since either polyethylene or polypropylene, a modified product thereof, or a copolymer thereof is a crystalline polymer, a certain amount of heat is required for the phase transition during melting, and thus the change upon irradiation with a laser beam of a certain energy or less is small.

Since aromatic hydrocarbons in the aryl group are resonance hybrids and have excellent heat resistance, deformation or the like is easily prevented when the spacer layer is irradiated with a laser beam having a level of energy sufficient to remove the reflective layer. Meanwhile, since the aromatic hydrocarbons have a large ratio of carbon in the molecules, they are easy to carbonize, and when they are carbonized by a sufficient amount of heat, they can develop a sufficiently black color even in thin layers. When the material of the spacer layer 20 is a polymer containing an aryl group, if the irradiation energy of the laser beam is sufficiently high, the reflective layer can be removed and the spacer layer 20 can be carbonized to develop a black color. The reflective layer provided on the carbonized portion of the spacer layer 20 need not be removed. By either having the laser beam focused away (50 μm or more and 350 μm or less, depending on the irradiation energy and depth of focus of the laser beam) from the reflective layer, or having the reflective layer provided after the spacer layer 20 is carbonized, it is possible to not remove the reflective layer in the carbonized portion.

This carbonized removed region is difficult to read with a bar code reader, but has excellent visibility. Therefore, a visible code can be recorded in this region. The visible code may be a sequence of symbols, alphabets, numbers, or a combination of these. Thus, the visible code enables efficient processing of a barcode reader, and visual verification of the code. The visible code in the carbonized removed region can also be recorded in the hologram part to prevent tampering.

The visible code may also include some or all of the information in the data of the code recorded as a barcode. The visible code may store a correspondence of a barcode in a table on the data server. A code obtained by encrypting the data recorded as a barcode may also be recorded in the visible code. A hash can also be used to include some of the information in the data of the code recorded as a barcode. The hash may be a cryptographic hash. Thus, while a large amount of data is read from the barcode using the machine, visual confirmation can be easily performed.

An adhesive layer containing an acrylic resin as a main component may also be provided adjacent to the spacer layer 20. Although the acrylic resin has low heat resistance, its thermal decomposition is a depolymerization type. Thus, if the acrylic resin has a certain molecular weight, the molecular structure remains after irradiation with a laser beam and performance can be maintained. The molecular weight of the acrylic resin is preferably 100,000 or more. When the molecular weight is large, the glass transition temperature also rises. Therefore, when the glass transition temperature is higher than a certain level, the molecular weight is generally large. Therefore, an acrylic resin with the glass transition temperature of 40° C. or more has a sufficiently large molecular weight to maintain its performance as an adhesive even when irradiated with a laser beam to the extent of removing the reflective layer. The adhesive layer may have a thickness of 0.1 μm or more and 10 μm or less.

The distance between the reflective layer and the reflective scattering layer 10 is preferably 10 μm or more, in consideration of the influence on the reflective scattering layer 10 due to the impact caused by the removal of the reflective layer. The thickness of the spacer layer 20 is preferably 10 μm or more in consideration of the influence of the laser beam on the reflective scattering layer 10 due to the impact caused by the removal of the reflective layer, more preferably 25 μm or more in terms of heat conduction, and more preferably 50 μm or more considering, of the focus size, the allowable range where the laser beam is not incident on the reflective scattering layer 10.

The material for the spacer layer 20 may be polymer. When the spacer layer 20 is made from same type of material as the reflective scattering layer 10, it becomes easy to bond the spacer layer 20 and the reflective scattering layer 10 together by thermal fusion.

The spacer layer 20 preferably has a thickness in the range of 25 μm or more and 200 μm or less. When the thickness is 25 μm or more, damage to the reflective scattering layer 10 is easily prevented. When the thickness is 200 μm or less, the protrusion of the optical assembly 1 during lamination or embedding is less likely to be perceived, and the flexibility of the spacer layer can be easily obtained.

The image forming reflector 30 is partially formed between the protective layer 40 and the spacer layer 20. In the optical assembly 1, a region where the image forming reflector 30 is disposed is a first region. When the optical assembly 1 is observed in the thickness direction, the outer shape (outer shape of the first region) may be an intended shape. The intended shape may be a shape for verifying the authenticity of the optical assembly 1, or a shape for identifying the optical assembly 1. In other words, the intended shape may be used for authentication. The intended shape may also be used for identification. The intended shape may be of a size that can be visually recognized with the naked eye, or a size that can be visually recognized with a microscope. The intended shape can be observed by illuminating the optical assembly from a side opposite to the observer. In the structure in which the reflective scattering layer 10 is provided on the surface of the spacer layer 20 on a side facing away from the image forming reflector 30, the optical assembly 1 can be observed by illuminating from the observer side.

The main component of the reflective layer may be an inorganic material. The inorganic substance may be metal, metal compound, or silicon oxide. Examples of metals include aluminum, silver, tin, chromium, nickel, copper, and gold. The purity of these metals may be 99% or more. The purity may be 99.99% (4 N) or more. A purity of 4N or higher readily reduces defects when the metal is removed by a laser beam. Examples of the metal compound include titanium oxide, aluminum oxide, and zinc sulfide. Metal compounds generally have a high refractive index.

The reflective layer may be formed by deposition or printing. The deposition may be physical deposition or chemical deposition (CVD).

The physical deposition may be vacuum vapor deposition or sputtering. The target metal may be various metallic targets having a purity of 4N or higher.

The ink formed by printing may be an offset ink, a silkscreen, a letterpress ink, a gravure ink, or the like, depending on the printing method. The ink may be resin ink, oil-based ink, water-based ink, or the like. Furthermore, depending on the difference in the drying method, the ink may be an oxidative polymerization ink, a penetrative drying ink, an evaporation drying ink, or an ultraviolet curable ink. The ink may be a pigment ink, a dye ink, or a mixture thereof. An example of a pigment ink may be magnetic ink. Magnetic ink can form patterns using its magnetic properties. Such a distinctive pattern easily increases the difficulty of counterfeiting. An example of a dye ink is a liquid crystal ink. An example of a liquid crystal ink is cholesteric liquid crystal ink. Cholesteric liquid crystals reflect light of a specific wavelength. Thus, a colored reflective layer is formed. The reflectance is changed depending on the rotation direction of circularly polarized light and elliptically polarized light. A functional ink whose color changes according to an illumination angle or an observation angle may be used as the reflective layer. Examples of such functional ink include Optical Variable Ink, a color shift ink, and a pearl ink.

Portions of the image forming reflector 30 are removed in planar view of the optical assembly 1, which will be described in detail below. Thus, an identifier including a machine-readable code is formed. The machine-readable code may be a barcode which can be read by a barcode reader.

The single-layer reflective layer preferably has a thickness of 30 nm or more and 300 nm or less. When the thickness is 30 nm or more, the contrast between ON and OFF bits required for reading the recorded code is easily obtained. When the thickness is 300 nm or less, the image forming reflector 30 can be easily removed with a laser beam.

The metallic reflective layer preferably has a thickness of 30 nm or more and 300 nm or less. When the thickness is 300 nm or less, the occurrence of ablation due to excessive energy absorption during the removal of the metallic reflective layer can be easily prevented. The metallic image forming reflector 30 has good concealing properties. A concealed pattern may thus be formed on the base of the image forming reflector 30.

The thickness of the reflective layer made of the metal compound or silicon oxide is preferably 20 nm or more and 150 nm or less. When the thickness is 20 nm or more, the reflection at the interface between the metal compound and the protective layer can be obtained. When the thickness is 150 nm or less, the reflective layer is easily removed using the laser beam. An image forming reflector 30 formed of a metal compound or silicon oxide easily enhances translucency. A metal compound generally has a high refractive index and is easy to increase the reflectance. An image forming reflector 30 formed of the metal compound or silicon oxide is not capable of concealing the underlying pattern and thus the underlying pattern can be seen through it.

When the image forming reflector 30 has two reflective layers, the thickness may preferably be 100 nm or more and 1500 nm or less. The image forming reflector 30 having two reflective layers may be formed by deposition of metal compounds or silicon oxides different from each other. The image forming reflector 30 having two reflective layers may have one reflective layer formed by deposition of a metal compound or silicon oxide, and the other reflective layer formed by deposition of metal.

The image forming reflector 30 may be partially removed by chemical etching. In other words, the image forming reflector 30 may be partially formed.

When the image forming reflector 30 has two reflective layers and is partially formed, the outer shapes of the reflection reflected from the two reflective layers may overlap with each other. In this case, the image forming reflector 30 shows an image of the outer shape of the two reflective layers when observed as transmitted light. If one of the reflective layers of the image forming reflector 30 is a deposition of metal compound or silicon oxide and the other reflective layer is a deposition of metal, a reflective layer of the deposition of the metal compound or silicon oxide may be formed over the entire surface and a reflective layer of the metal deposition may be partially formed. In this case, an image of the outer shape of the reflective layer of the metal deposition can be observed, and an image of the relief structure can be observed even in a region having no metal deposition.

The aesthetic appearance can be improved by removing portions of the image forming reflector 30. The outer shape of the partially formed image forming reflector 30 may be a security motif. The security motif may be an authentication motif or a verification motif. The security motif may be a line drawing, a geometric pattern, text, or calligraphy. An example of a geometric pattern is a guilloche. An example of text is microtext. Examples of calligraphy include Western calligraphy, Islamic calligraphy, Georgian calligraphy, Chinese calligraphy, Japanese calligraphy, Korean calligraphy, Filipino Suyat calligraphy, Thai calligraphy, Indian Oriya script, and Nepalese calligraphy.

The protective layer 40 has the same translucency or same transparency as the spacer layer 20 and protects the planar shape of the image forming reflector 30 to maintain the above-described code to be in a machine-readable state.

The protective layer 40 may be formed of various resins. The resin of the protective layer 40 may be a polycarbonate resin or an acrylic resin. The resin of the protective layer 40 may be a thermoplastic resin or a cured resin. When the protective layer 40 is made from the same type of material as the spacer layer 20 and the reflective scattering layer 10, it is easy to bond all the layers together by thermal fusion. The difference in softening temperature between the protective layer 40, the spacer layer 20, and the reflective scattering layer 10 may be within 30° C. This makes it easy to join the layers together by thermal fusion. The protective layer 40 may have a thickness of 50 μm or more and 400 μm or less.

Figure 2:
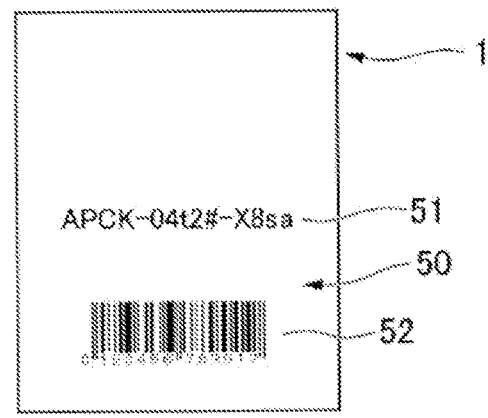
FIG. 2 is a plan view schematically illustrating the optical assembly according to the first embodiment.

FIG. 2 shows an example of a plan view of the optical assembly 1 viewed from the protective layer 40 side in the thickness direction of the optical assembly 1. FIG. 2 shows an example in which a visible code 51 and a barcode 52 are formed as an individual information record (image information record) 50. The visible code 51 is formed by carbonized portions of the spacer layer 20. A barcode 52 is formed by removed portions of the image forming reflector 30. The barcode 52 includes a code which is machine readable formed from the data of the visible code 51. The barcode 52 may contain a number or the like indicating an identification code at the bottom of the plurality of bars. The individual information record 50 may include the identification code. The optical assembly 1 may be used as a security pass. The image forming reflector 30 at a region overlapping the partially carbonized spacer layer 20 may or may not be removed.

When removed, the authentication information and the identification code of the image forming reflector 30 can be seen as one unit. If not removed, the identification code can be sealed by the image forming reflector 30 with an authenticatable image formed thereon. The sealed identification code is easily visible by peeling off the image forming reflector 30. The image forming reflector 30 may have a brittle structure that breaks upon peeling. This makes it more difficult to tamper with the optical assembly 1.

In FIG. 2, the visible code 51 and the barcode 52 are formed in the first region of the image forming reflector 30. Although the visible code 51 and the barcode 52 are formed in FIG. 2, the barcode 52 only may also be used. The visible code 51 and the barcode 52 may be an identification code. The identification code of the barcode 52 may be a product code or a serial number. In this case, the optical assembly 1 may be a product tag. The optical assembly 1 may be a gift card. In this case, the visible code 51 may be a claim code and the identification code of the barcode 52 may be a serial number. The visible code may be a code in which the spacer layer 20 is carbonized with a laser beam, having data recorded thereon.

The individual information that can be recorded may be a biometric identifier, a code, personal data, a symbol, or a combination thereof. Examples of the biometric identifier include a facial image, a fingerprint, a signature, a walking motion, a voiceprint, an iris, and a vein pattern. Examples of personal data include name, country name, country code, and ID number. The optical assembly 1 has an iridescent, white, metallic appearance in reflection. A facial image has an iridescent, white, metallic appearance in reflection. The barcode 52 has an iridescent, white, metallic appearance in reflection. The iridescent, white, metallic appearance may be switched between different viewing conditions. The optical assembly 1 may have an iridescent region, a white region, or a metallic luster region.

[Method of Producing Optical Assembly 1]

Figure 3:
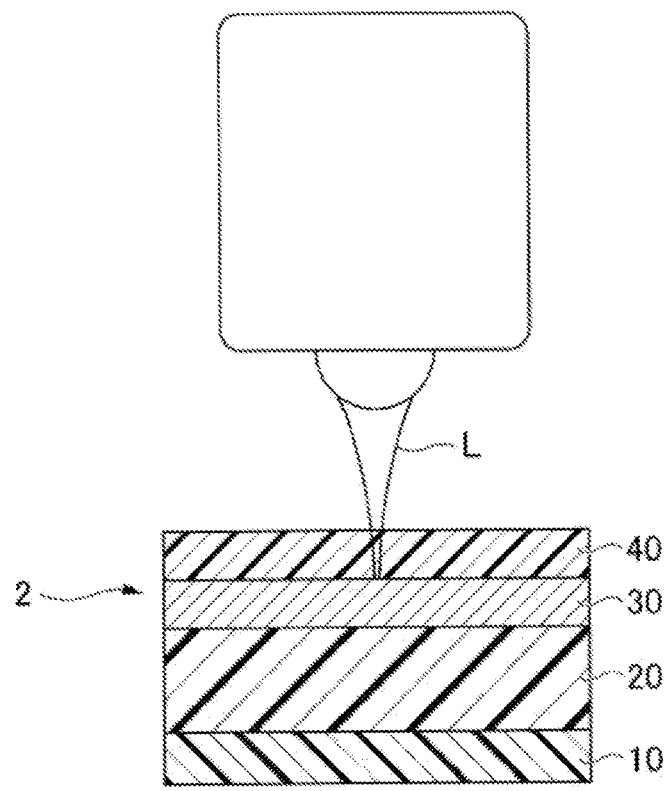
FIG. 3 is a diagram illustrating a process of producing the optical assembly according to the first embodiment.

A method of producing the optical assembly 1 will be described with reference to FIGS. 3 and 4. FIG. 3 shows a pre-assembly 2 having the same laminated structure as the optical assembly 1 and in which the individual information record 50 is not formed in the image forming reflector 30. As shown in FIG. 3, the pre-assembly 2 is irradiated with a laser beam L from the protective layer 40 side, and a portion of the image forming reflector 30 is removed to form an individual information record 50. Thus, the optical assembly 1 is produced.

The power of the laser beam L should be sufficient to remove only the image forming reflector 30 in the irradiated range, and not cause discoloration or alteration of the spacer layer 20 and the reflective scattering layer 10 which are disposed under the irradiated range. An example of the laser beam may be a pulsed laser beam.

Figure 4:
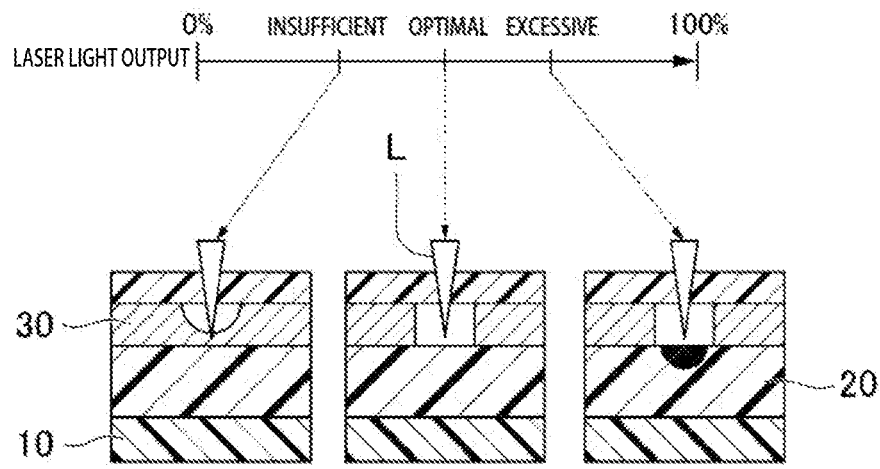
FIG. 4 is a diagram illustrating the relationship between the intensity of a laser beam and the removal of an image forming reflector.

FIG. 4 shows that when the power of the laser beam L is excessive, the spacer layer 20 and the reflective scattering layer 10 are damaged by heat generated by the laser beam L or the laser beam L, resulting in discoloration or the like (right side of FIG. 4). Conversely, when the power of the laser beam L is insufficient, the image forming reflector 30 in the irradiated region is not completely removed (left side of FIG. 4), and the light incident from the protective layer 40 side does not sufficiently reach the reflective scattering layer 10. In either case, the visibility of the visible code 51 and the readability of the barcode 52 with the barcode reader are adversely affected.

A suitable range of the power of the laser beam L can be easily set by a preliminary experiment using the pre-assembly 2.

The power of a pulsed laser may be modulated by the transmission frequency. The light source of the pulsed laser beam may be a solid-state laser. The solid-state laser may be a YVO4 or YAG laser. The wavelength of the pulsed laser beam may be 1064 nm, 532 nm, or 355 nm. These are the oscillation wavelength of the YAG laser, its second harmonic, and its third harmonic. The oscillation frequency (Q-switch frequency) of the pulsed laser is preferably 1 kHz or more and 1 MHz or less. The pulse width of the pulsed laser is preferably 1 ns or more and 100 ns or less.

The energy of one pulse of the pulsed laser is preferably 0.02 mJ or more and 20 mJ or less. The laser output power is preferably 1 W or more and 20 W or less. The light source of the laser can be, for example, DPSS YAG wavelength: 1064 nm. An example of a laser light source is MD-V series YVO4 laser manufactured by Keyence Corporation. With a pulsed laser, the power can be easily adjusted, and sharp writing is possible.

Emission of the laser beam L of the pulsed laser beam to the first region which is the image forming reflector 30 causes portions of the reflective layer of the image forming reflector 30 to be removed in the form of spots. Linear scan of the spots using a laser beam L causes portions of the image forming reflector 30 to be removed in a linear shape which will be referred to below as removed linear segments.

Gradation can be recorded by the number of spots (spot density) per unit area. Therefore, a removal of a portion of the image forming reflector 30 using the laser beam L of the pulsed laser beam causes an image having a halftone to be formed. The halftone of the facial image can be reproduced by the laser beam L of the pulsed laser beam.

Figure 5:
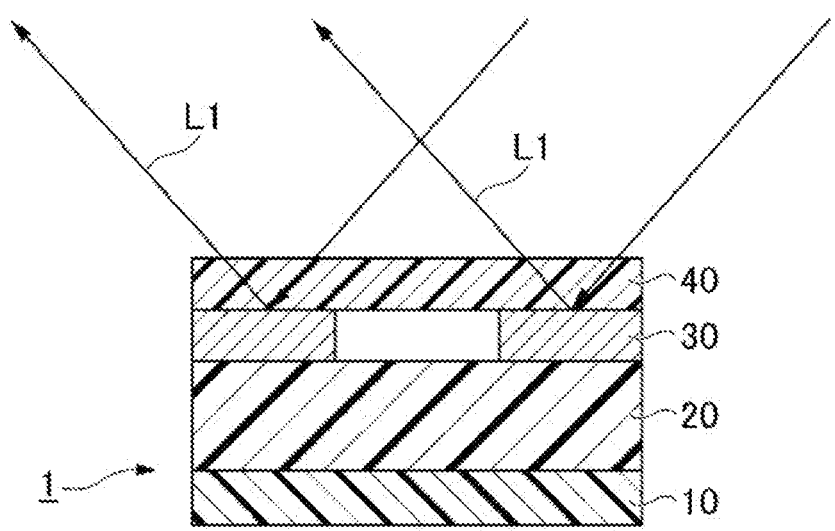
FIG. 5 is a view illustrating the behavior of light incident on the optical assembly.
Figure 6:
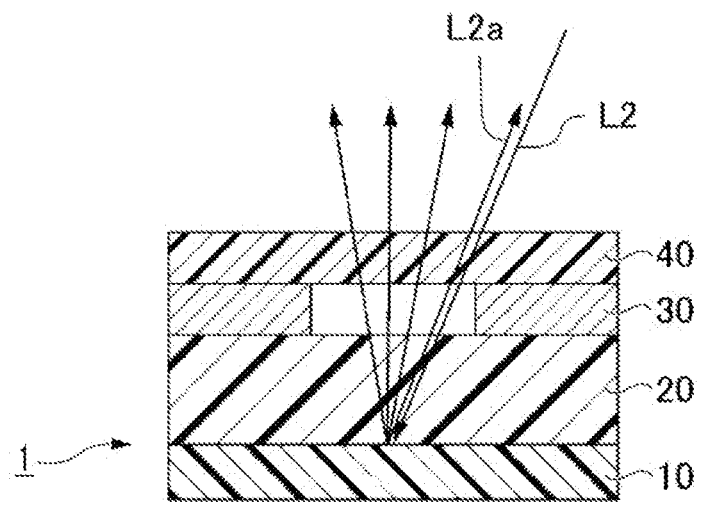
FIG. 6 is a view illustrating the behavior of light incident on the optical assembly.

With reference to FIGS. 5 and 6, the behavior of light emitted from the protective layer 40 side and from a direction different from the normal line to the completed optical assembly 1 will be described. As shown in FIG. 5, the light L1 reflected by the image forming reflector 30 generally travels in a direction different from the incident direction of the light L. As shown in FIG. 6, the light L2 incident on the portion where the image forming reflector 30 has been removed passes through the spacer layer 20 and reaches the reflective scattering layer 10, where it is diffused. As a result, a portion of the incident light L2a returns to the direction of incidence.

Therefore, among light emitted from the barcode reader, light hitting the image forming reflector 30 is not received by the barcode reader, and light hitting the portion where the image forming reflector 30 has been removed is received by partially returning to the reader. The reader detects a low signal level region and a high signal level region. The low signal level region is a region where the image forming reflector 30 exists and the high signal level region is a region where the image forming reflector 30 is removed.

As a result, in the visible code 51 and the barcode 52 (that is, the first region), the image forming reflector 30 remains in a portion corresponding to a black portion (a region recognized as black by a reader), and the image forming reflector 30 is removed in a portion corresponding to a white portion (a region recognized as white by a reader), thereby forming the individual information record 50. The individual information record 50 may be visible in transmission or reflection. The individual information record 50 may be machine readable in transmission or reflection.

A region to be recognized as white by the reader has the image forming reflector 30 removed.

For example, in the XY plane of the image forming reflector 30 in planar view, a region of one white line extending in the Y direction is formed by scanning the laser beam a plurality of times in the width direction (X direction) of the white line. The white mode recognized by a reader can be adjusted by adjusting the number of irradiation scans and the number of non-irradiation scans (that is, the spacings between the irradiation scans) that are continuous along the longitudinal direction (Y direction) of the white line. The higher the ratio of the irradiation scans to the region of one white line, the higher the contrast during machine reading. The lower the ratio of the irradiation scans to the region of one white line, the higher the brightness of the reconstruction image of the identifier in visual observation. The contrast in machine reading and the brightness of the reconstruction image in visual observation are generally in a trade-off relationship.

Figure 7:
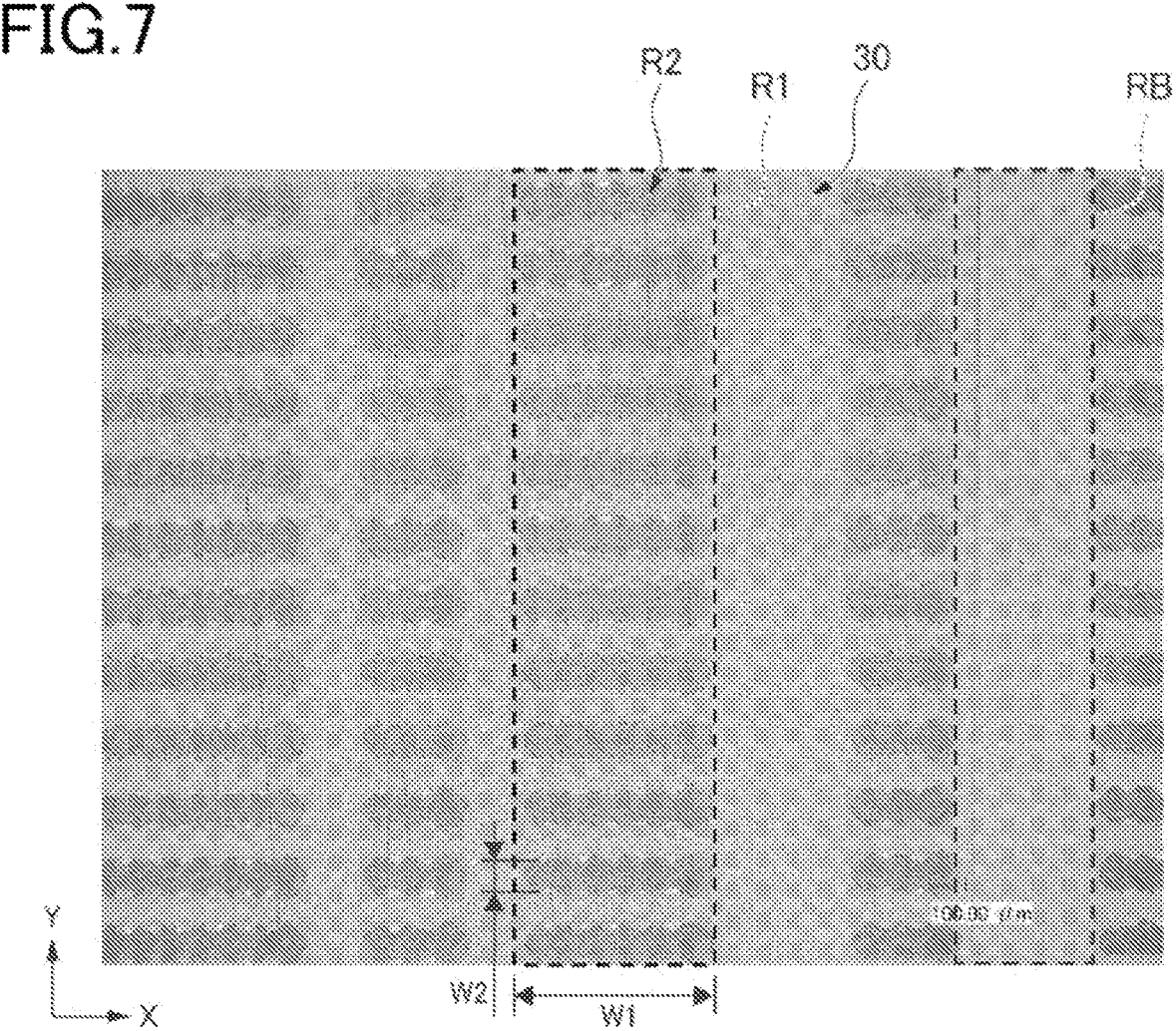
FIG. 7 is an enlarged photograph of an identifier in the optical assembly.
Figure 8:
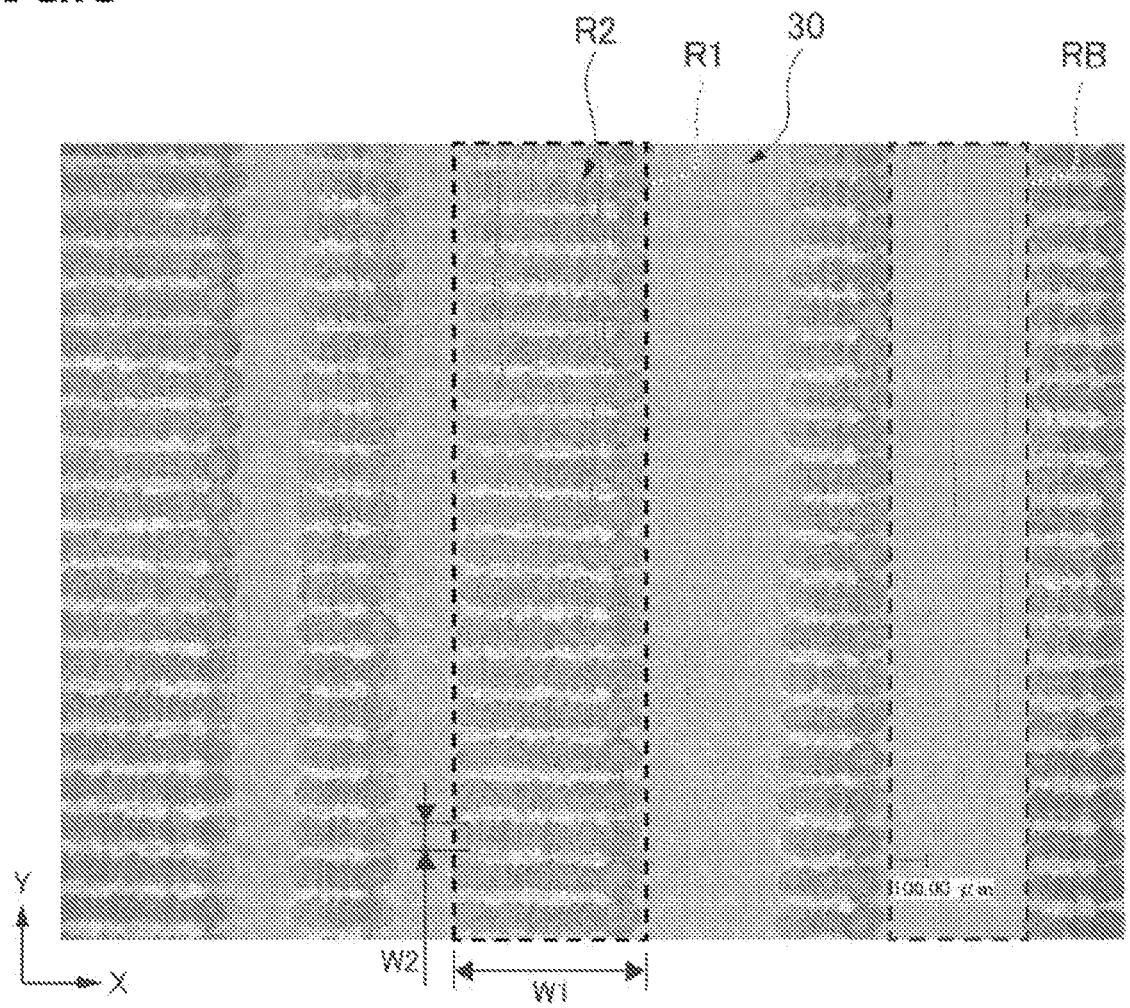
FIG. 8 is an enlarged photograph of an identifier in the optical assembly.

FIGS. 7 and 8 each show an enlarged view of an identifier (for example, barcode 52) of the image forming reflector 30 when the optical assembly 1 is viewed in planar view. FIG. 7 shows an enlarged view of a region including a white level region R1 excellent in brightness of a reconstruction image. FIG. 8 shows an enlarged view of a region including a white level region R1 having a higher contrast for machine reading than in FIG. 7. In FIGS. 7 and 8, a plurality of white level regions R1 extending in the Y direction are formed. A plurality of removed linear segments (removed regions) R2 are provided in each white level region R1. Each of the removed linear segments R2 extends in the X direction in the white level region R1. In FIGS. 7 and 8, it can be seen that the ratio of the removed linear segments R2 occupied in the white level region R1 is different.

The white level region R1 has a plurality of removed linear segments R2 from which the image forming reflector 30 is partially removed. The removed linear segments R2 may be parallel to each other. Specifically, the removed linear segments R2 may be arranged in a stripe shape. The intervals between the removed linear segments R2 may be equal in length. Equal spaced intervals improve the readability of the code. The intervals between the removed linear segments R2 may vary in length. For example, the intervals between the removed linear segments R2 may have a first space width and a second space width narrower than the first space width. The intervals between the removed linear segments R2 may include a wide interval and a narrow interval. The intervals between the removed linear segments R2 in the white level region R1 may gradually narrow toward a predetermined direction.

The white level of the white level region R1 may be modulated in proportion to the intervals between the removed linear segments R2. The intensity of the signal read as a white level may be varied. Multilevel recording may be performed by the intensity difference of the signals. Authentication information may also be recorded at variations of the intervals. The authentication information may be a digital code using encryption or a guilloche pattern.

A residual segment is provided between the removed linear segments R2. The longitudinal direction of the removed linear segment R2 may be different from the longitudinal direction of the white level region R1. Specifically, the longitudinal direction of the removed linear segment R2 may be perpendicular to the longitudinal direction of the white level region R1. When the visible image formed in the image forming reflector 30 is a barcode, the recording time of the barcode can be shortened because the recording area of the barcode and the longitudinal direction of the removed linear segment R2 are parallel to each other.

The removed linear segment R2 may be straight or curved. A straight-type removed linear segment R2 enables easy recording. A curved-type removed linear segment R2 enables the authentication information to be recorded as the shape of the curve.

Hereinafter, when the direction in which the white level region R1 extends is defined as the longitudinal direction (Y direction in FIGS. 7 and 8), the width of the white level region R1 in the direction intersecting the longitudinal direction (X direction in FIGS. 7 and 8) is referred to as the width W1 of the white level region R1.

The "width W2 of the removed linear segment R2" indicates the width of the removed linear segment R2 in the direction (Y direction in FIGS. 7 and 8) intersecting the longitudinal direction in which the removed linear segment R2 extends.

Although the width W1 of the white level region R1 and the width W2 of the removed linear segment R2 can be observed as having widths not equal to each other, the width W1 and the width W2 may be an average value, a maximum value, or a designed value.

The width W2 of the removed linear segment R2 may be less than ½ of the width W1 of the white level region R1. Further, the width W2 of the removed linear segment R2 may be 1/10 or more of the width W1 of the white level region R1. The width W2 of the removed linear segment R2 is preferably 10 μm or more and 300 μm or less. When the width W2 is 10 μm or more, removal using a normal laser beam is possible. When the width W2 is 300 μm or less, the diameter of the scan beam for reading a code is sufficiently decreased.

The reflective layer of the white level region R1 can be removed at an area ratio of 15% or more and 60% or less. When the removed area ratio is 15% or more, light having directional scattering, diffraction and resonance is observed owing to the fine concavo-convex structure of the image forming reflector 30 during observation of the image forming reflector 30 in the reflected light. The area ratio occupied by the removed linear segment R2 in the white level region R1 can be made uniform in the surface of the optical assembly 1 (alternatively, in one or more white level regions R1 in the surface of the optical assembly 1). The area ratio may also be continuously changed in the vicinity of the center and at the periphery in the plane of the optical assembly 1.

A black level region RB may be arranged between the two white level regions R1 arranged in the X direction. In the black level region RB, the image forming reflector 30 (or the reflective layer of the image forming reflector 30) is partially removed or not removed at all. In other words, the black level region RB has a remaining segment and may have the removed linear segment R2.

When the black level region RB has a removed linear segment R2, the area ratio of the removed linear segment R2 of the black level region RB is smaller than the area ratio of the removed linear segment R2 of the white level region R1. The area ratio of the remaining segments in the black level region RB and the area ratio of the remaining segments in the white level region R1 are preferably in the range of 2:1 or more and 10:1 or less. When the area ratio is 2:1 or more (that is, the area of the remaining segment of the black level region RB is twice or more the area of the remaining segment of the white level region R1), an observable contrast is likely to be obtained. When the area ratio is larger than 10:1 (that is, the area of the remaining segment of the black level region RB is larger than 10 times the area of the remaining segment of the white level region R1), the difference in luminance between the reflected light of the white level region R1 and the reflected light of the black level region RB is difficult to visually recognize.

The respective widths of the white level region R1 and the black level region RB in the respective directions intersecting the respective longitudinal directions (X direction in FIGS. 7 and 8) may correspond to recorded information in the barcode 52. The standard size of the width of one module, which is the recording unit of the bar of the barcode, is specified as 0.33 mm, and the JAN standard barcode specifies the width of one module as 0.15 times to 2.1 times the standard size, while JIS X 0507 recommends 0.8 times to 2.0 times the standard width.

The width of one module, which is the recording unit of the barcode 52, is preferably in the range of 33 μm to 700 μm. The minimum width (minimum width of each region in the direction intersecting the longitudinal direction of the white level region R1 and the black level region RB) between the bars of the barcode 52 may be 33 μm or more. When the width of the barcode is 33 μm or more, the barcode 52 can be formed by a laser beam.

The maximum length of the barcode 52 (maximum value of the length of the white level region R1 and the black level region RB in the longitudinal direction) depends mainly on the size of the barcode reader, and if the size is 10 cm or less, the barcode 52 can be read by a standard barcode reader. For the purpose of reducing a reading error from occurring, the maximum length of the barcode 52 is preferably 6 mm or less.

A plurality of white level regions R1, and a plurality of black level regions RB which are sandwiched between two white level regions R1 adjacent in the X direction are formed. Such alternate arrangement of the white level region R1 and the black level region RB enables the barcode 52 encoded with the data or the like of a card holder recorded in the visible code 51 to be formed.

The image forming reflector 30 may have a concavo-convex structure. An image of the reflection from the image forming reflector 30 having a concavo-convex structure has higher intensity than an image which exhibits Lambertian reflectance such as a normal printed matter. In other words, the image of reflection from the image forming reflector 30 having a concavo-convex structure is observed like a highlighted image. Such a high-intensity image is likely to be recognized as having the same level of brightness as an image having an intensity not less than a certain level. Therefore, the image of reflection from the image forming reflector 30 having a concavo-convex structure is recognized at the same level in both the white level region R1 and the black level region RB.

A gray level region may also be provided in which the ratio of the remaining segments is at a level intermediate between the white level region R1 and the black level region RB. In the gray level region, the removed linear segment R2 may be formed in a dotted line. By adjusting the interval of the dotted lines, the level of the luminance can be adjusted. The interval between the dotted lines in the gray level region may be constant or variable. When the interval is varied, the brightness level is easy to adjust precisely. When the interval is constant, the brightness level is easy to adjust correctly.

As described above, in the optical assembly 1 of the first embodiment, by removing a part of the image forming reflector 30, the individual information record 50 is formed. Since the individual information record 50 is covered with the protective layer 40, it is difficult to place the material of the image forming reflector again on the removed portion. Thus, it is difficult to tamper with the individual information record 50 recorded in the image forming reflector 30. The individual information record 50 of the optical assembly 1 has a high counterfeit-resistance. The optical assembly 1 with the individual information record 50 has a high level of security, unlike a code printed on paper.

Additionally, the formed individual information record 50 has an iridescent, white, and metallic luster, making it aesthetically pleasing. The individual information record 50 may be an identifier including a code that can be read by the difference in reflectivity between the white level region R1 and the black level region RB. The optical assembly 1 in which the individual information record 50 is formed resolves a conflict between aesthetics and readability.

Placing the spacer layer 20 between the image forming reflector 30 and the reflective scattering layer 10 causes the image forming reflector 30 and the reflective scattering layer 10 to be separated from each other. Thus, the reflective scattering layer 10 can be prevented from being damaged when the individual information record 50 is formed by removing a portion of the image forming reflector 30.

The image forming reflector 30 has a white level region R1 and a black level region RB in planar view of the image forming reflector 30. The white level region RB has a plurality of removed linear segments R2 formed thereon, and the black level region RB is sandwiched between the white level regions R1. For example, an iridescent, white, metallic appearance can be imparted to a barcode or the like encoded with data or the like of a card holder recorded in the visible code 51.

Second Embodiment

A second embodiment of the present invention will be described with reference to FIGS. 9 to 11B. In the following description, components that are common to those described above are denoted by the same reference signs, and duplicated description thereof will be omitted.

Figure 9:
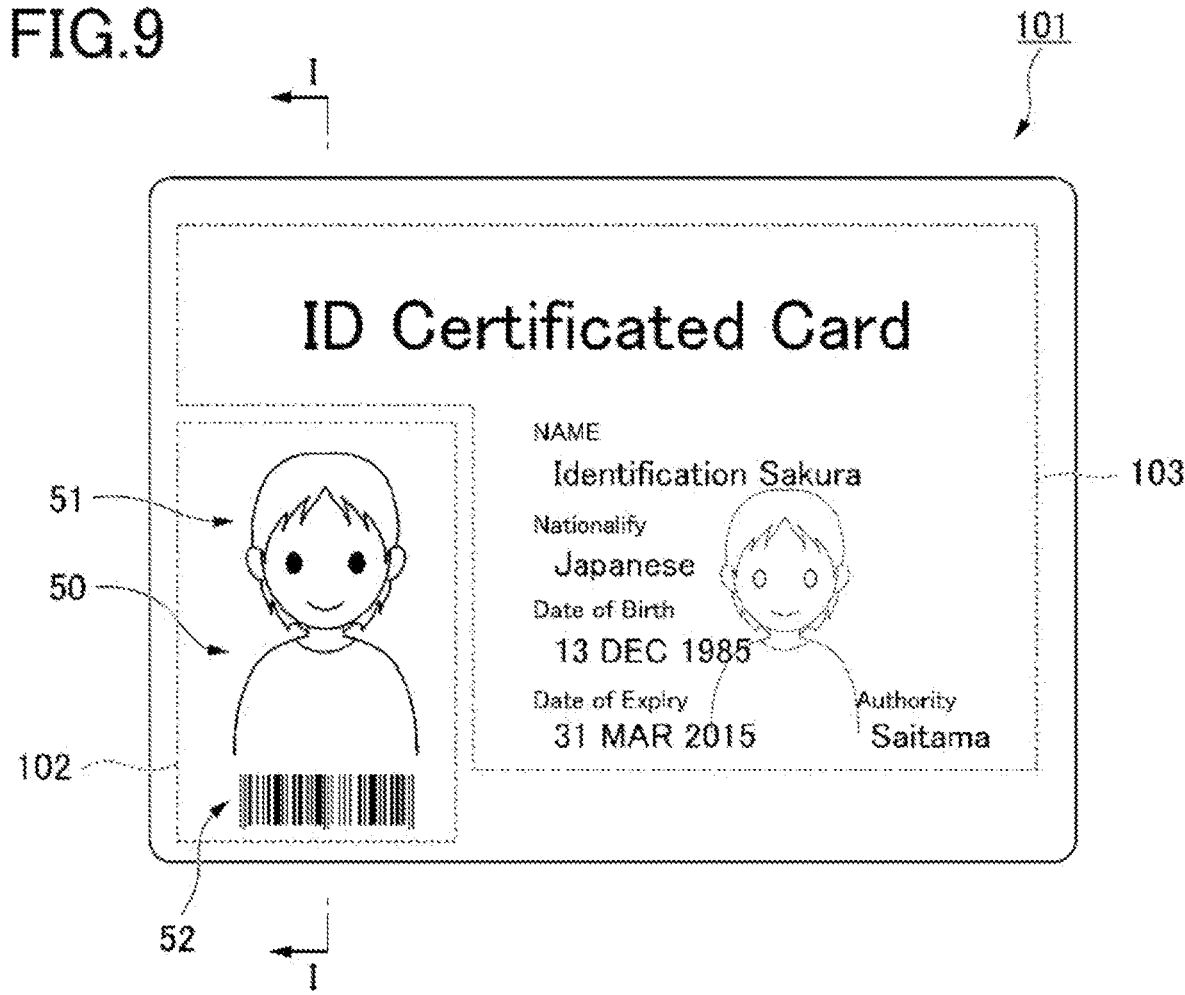
FIG. 9 is a plan view of an optical assembly according to a second embodiment of the present invention.

FIG. 9 is a plan view of a card 101 which is an optical assembly of the second embodiment. The card 101 has a first region 102 and a second region 103. The first region 102 includes the individual information record 50 formed therein, and the second region 103 includes a text or a facial image written by a laser beam therein. The first region 102 has an identifier including a code (for example, a bar code 52 which can be read by a bar code reader) which can be read by a machine. Text and facial images in the second region 103 are visible. Text and facial images in the second region 103 may be an identifier. Text and facial images in the second region 103 may be individual information. The text and the facial image in the second region 103 may be the information of the card holder. The card 101 may be applied to a single page of the booklet. Examples of booklets are passport booklets and visa booklets.

Figure 10:
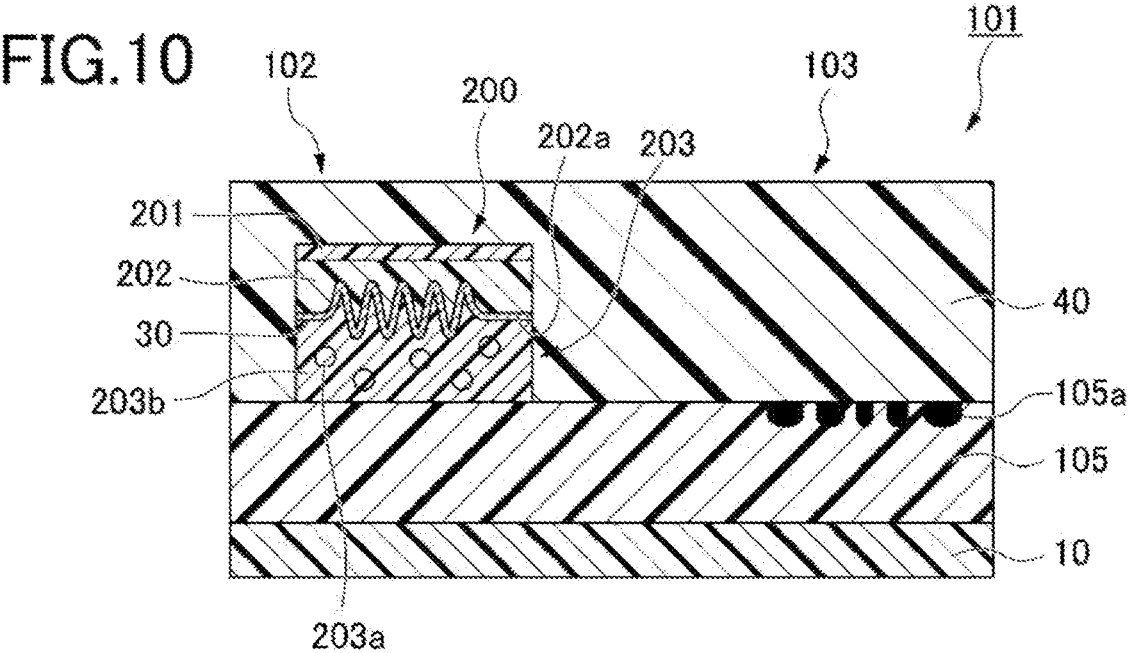
FIG. 10 is a view schematically illustrating a cross-sectional assembly taken along the line I-I of FIG. 9.

FIG. 10 is a schematic cross-sectional view taken along the line II-II of FIG. 9. The card 101 includes a spacer layer 105 instead of the spacer layer 20. The material of the spacer layer 105 is a polymer containing an aryl group. A visible code can be written on the spacer layer by irradiating the spacer layer with a laser beam. The polymer containing an aryl group is the same as the polymer containing an aryl group described in the first embodiment. The spacer layer 105 has a structure capable of laser writing a visible code. The spacer layer 105 may have a thickness of 50 µm or more and 400 µm or less.

In the first region 102 of the card 101, a transfer foil 200 having an image forming reflector 30 is interposed between the spacer layer 105 and the protective layer 40. Meanwhile, in the second region 103, the protective layer 40 is arranged over the spacer layer 105, but has no image forming reflector 30.

The transfer foil 200 includes a release layer 201, an embossed layer 202 formed on the release layer 201, the image forming reflector 30 formed on the embossed layer 202, and an adhesive layer 203 formed on the image forming reflector 30. The release layer 201 is mainly composed of an acrylic resin and may contain silica powder. An anchor layer (not shown) may be provided between the image forming reflector 30 and the adhesive layer 203. Further, a mask layer (not shown) may be provided between the image forming reflector 30 and the anchor layer.

The embossed layer 202 is made of resin or the like, and has an optical relief having fine concave portions and convex portions on the surface 202a facing the adhesive layer 203. The relief structure of the embossed layer 202 is the same as the relief structure described in the first embodiment.

As shown in FIG. 10, the adhesive layer 203 of the transfer foil 200 may be adhered to the spacer layer 105. In this case, the embossed layer 202 is disposed between the protective layer 40 and the image forming reflector 30 in the thickness direction, and the release layer 201 may be used as the protective layer.

The adhesive layer 203 of the transfer foil 200 may be bonded to the protective layer 40. The embossed layer 202 is interposed between the spacer layer 105 and the image forming reflector 30 in the thickness direction.

With the above configuration, the transfer foil 200 exhibits a predetermined optical effect such as a hologram or a diffraction grating.

The adhesive layer 203 may be made of a composite material containing two kinds of resins. The adhesive layer 203 may contain an inorganic powder. The composite material has a sea-island structure containing a plurality of resin particles 203a made of a first resin, and a base material portion 203b made of a second resin which fills the space between the resin particles 203a. In this sea-island structure, the refractive index of the resin particles 203a is different from that of the base material portion 203b. Thus, the adhesive layer 203 has a non-uniform refractive structure (domain) having refractive indices individually defined for each portion of the adhesive layer.

<Production Method of Card 101>

First, the transfer foil 200 is produced. The transfer foil 200 is formed by laminating the release layer 201, the embossed layer 202, the image forming reflector 30, and the adhesive layer 203 in this order on a plastic film (not shown).

Next, the card 101 is formed. On a card base-material provided with the reflective scattering layer 10 and the spacer layer 105, the plastic film and the transfer foil 200 are arranged with the adhesive layer 203 facing the card base-material. When the plastic film is peeled off after applying heat and pressure to the transfer foil 200 from above the plastic film, the transfer foil 200 is bonded to the card base-material.

The card base-material and the transfer foil 200 are then covered with a plastic film which serves as the protective layer 40, and laminated by applying heat and pressure to produce a card 101 having the first region 102 and the second region 103.

The release layer 201 may be colored. The resin of the release layer 201 can be colored by adding a pigment or a dye. The pigment can be an inorganic pigment, an organic pigment, or a mixture of both pigments. The pigment may be a single fluorescent pigment, a single pearl pigment, or a single magnetic pigment, a blend of the same type, a mixture of the different types, or a blend of the different types of the same type. Dyes can be natural, synthetic, or a mixture of natural and synthetic dyes. The dye may be a fluorescent dye.

The release layer 201 is formed on the plastic film by printing or coating. The coating may be gravure coating, micro gravure coating, or die coating. The printing may be gravure printing or screen printing. The plastic film may have a thickness of 10 µm or more and 50 µm or less, from a processability perspective. The release layer 201 preferably has a thickness of 0.5 µm or more and 5 µm or less. The release layer 201 is receptive to printing. The release layer 201 may consist mainly of an acrylic resin. An acrylic resin easily accepts printing. Printed matter with an OVD part optical variable device having a release layer which is receptive to printing can be integrally printed.

The card 101 (pre-assembly) immediately after production has no individual information record 50 formed yet, and thus has no information written in the second region 103. By irradiating the second region 103 with a laser beam, the spacer layer 105 is carbonized to form a laser mark 105a, and information (laser mark) 105a can be written. The information to be written as the laser mark may be personal data, a biometric identifier, or a code. An example of a biometric identifier includes a facial image. The information to be written in the second region 103 and the information to be written in the first region 102 may be different information of the same person. The same information of the same person may also be used. Some of the information may be the same information of the same person, and other information may be different information of the same person.

Irradiation of the first region 102 with a laser beam for removing a portion of the image forming reflector 30 enables the individual information record 50 to be formed while retaining the optical effect exerted by the transfer foil 200. The image forming reflector 30 has concave portions and convex portions which align with the embossed layer 202, unlike the optical assembly 1 shown in FIG. 1 of the first embodiment. However, the thickness of the image forming reflector 30 is on the nanometer order and sufficiently small with respect to the focal length (several tens of µm) of the laser beam, so that it does not affect the process of forming the individual information record 50.

When the adhesive layer 203 of the transfer foil 200 is affixed to the spacer layer 105, after the partial removal of the image forming reflector 30, the laser beam will penetrate the adhesive layer 203 and reach the spacer layer 105. Therefore, when the output power of the laser beam is high, the spacer layer 105 under the transfer foil 200 may be carbonized. However, since the adhesive layer 203 has a non-uniform refractive structure from the sea-island structure consisting of the resin particles 203a and the base material portion 203b, the laser beam is scattered by the adhesive layer 203 and enters the spacer layer 105 in a weakened state. Thus, the spacer layer 105 disposed under the transfer foil 200 is less likely to carbonize, resulting in easier setting of the intensity of the laser beam.

When the adhesive layer 203 of the transfer foil 200 is affixed to the protective layer 40, after the image forming reflector 30 is partially removed, the laser beam passes through the release layer 201 and reaches the spacer layer 105. When the release layer 201 contains silica powder or pigment, the laser beam is scattered by the release layer 201 and enters the spacer layer 105 in a weakened state. Thus, the spacer layer 105 disposed under the transfer foil 200 is less likely to carbonize, resulting in easier setting of the intensity of the laser beam.

The image forming reflector 30 of the first region 102 of the card 101 in the second embodiment includes the white level region R1 and the black level region RB as in the image forming reflector 30 of the first embodiment. Accordingly, the card 101 of the second embodiment has the same effect as the optical assembly 1 of the first embodiment. Combination of the individual information record 50 written in the first region 102, the information written in the second region 103, and the optical effect expressed by the transfer foil 200 further enhances security. The card 101 is configured such that the image forming reflector 30 on which the individual information record 50 is formed is covered with the protective layer 40, and thus tampering is difficult.

In the second embodiment, either the laser marking of the second region 103 or the forming of the identifier of the first region 102 may be performed first.

The adhesive layer 203 of the second embodiment does not necessarily have to have a non-uniform refractive structure. Even if the refractive index of the adhesive layer 203 is uniform, by appropriately setting the output of the laser beam, it is possible prevent the spacer layer 105 from being carbonized while removing the image forming reflector 30.

The aspect of making the refractive index of the adhesive layer 203 non-uniform is not limited to the sea-island structure described above. For example, an adhesive layer having a non-uniform refractive index may also be formed by mixing an inorganic filler or an organic filler having a refractive index different to each other with a base adhesive.

In the second embodiment, the relationship between the minimum intensity PL1 of the laser beam L for printing on the spacer layer 105 and the minimum intensity PL2 of the laser beam L for removing the image forming reflector 30 may satisfy PL1>PL2. The material of the spacer layer 105 and the image forming reflector 30 and the kind of the laser beam are set to satisfy this relationship, so that the identifier can be suitably formed.

The first region 102 in the second embodiment is not limited to the configuration including the transfer foil 200. For example, when the optical effect of the embossed layer 202 is not given to the first region 102, the image forming reflector 30 may be formed only in the portion serving as the first region, and the identifier may be formed by the same procedure as in the first embodiment.

The optical assembly of the present invention will be explained in further detail using examples and comparative examples. The term "part(s)" in the following description refers to "part(s) by mass" unless particularly mentioned otherwise.

Example 1

A card of Example 1 is a card corresponding to the card 101 of the second embodiment. This card is not provided with a transfer foil and has an image forming reflector 30 only in the first region 102.

Materials used for each portion in Example 1 are shown below.

Reflective scattering layer 10: white resin film (Polycarbonate, thickness 200 μm)

Spacer layer 105: a laser-writable transparent resin film (Polycarbonate, thickness 100 μm)

Protective layer 40: transparent resin film (Polycarbonate, thickness 100 μm)

Aluminum was vapor-deposited on a portion (length 35 mm×width 15 mm) of one side of the surface of the spacer layer 105 using a mask or the like to form an image forming reflector 30 having a thickness of 100 nm.

The reflective scattering layer 10, the spacer layer 105 on which the image forming reflector 30 was formed, and the protective layer 40 were stacked in the order of the reflective scattering layer 10, the spacer layer 105, the image forming reflector 30, and the protective layer 40. Then, this laminated body was heated and pressed (180° C., 0.81 MPa) to bond portions together using thermal fusion bonding by setting the time for the heat source to contact the laminated body as 15 minutes. After the laminated body was cooled, it was punched out into a rectangular shape having a length of 85 mm by a width of 54 mm to produce a pre-structure according to Example 1.

Example 2

Example 2 is a card corresponding to the card 101 of the second embodiment, and has a transfer foil 200 in a first region 102.

[Production of Transfer Foil]

A relief structure was formed by scanning an electron beam on a resist plate. After a sputtered film was vapor deposited on the surface of the relief structure, an electroforming plate was formed by electroforming.

A resin material was applied to one side of the surface of a PET film serving as a base material and then dried to form a release layer 201. On the release layer 201, an ultraviolet-curing resin as the embossed layer 202 was applied with a thickness of 3 μm, then an electroforming plate was pressed against the embossed layer 202. Through this process, an embossed layer 202 having a surface 202a on which the relief structure of the surface of the electroforming plate is transferred is formed. Aluminum vapor deposition was performed on the surface 202a of the embossed layer 202, to thereby form an image forming reflector 30. Lastly, an adhesive layer 203 containing the composite material described above (first resin crystalline polyester, second resin acrylic resin) was formed in the image forming reflector 30 with a thickness of 4 μm. As described above, a transfer foil 200 according to Example 2 supported on the base material via the release layer 201 was produced.

(Production of Pre-Assembly)

The same materials as those used in Example 1 were used for each portion. Vapor deposition was not performed on the spacer layer 105, but instead the transfer foil 200 was adhered to the spacer layer 105.

The reflective scattering layer 10, the spacer layer 105 on which the transfer foil 200 is formed, the transfer foil 200, and the protective layer 40 were stacked in the order of the reflective scattering layer 10, the spacer layer 105, the transfer foil 200, and the protective layer 40. Then, this laminated body was heated and pressed (180° C., 0.8 MPa) as in FIG. 10 to bond portions together by setting the time for the heat source to contact the laminated body as 15 minutes. This was punched out to the same size as that of Example 1 to form a pre-assembly according to Example 2.

(Formation of Individual Information Records)

The pre-assemblies of Examples 1 and 2 were irradiated with a laser beam having a wavelength of 1064 nm to partially remove the image forming reflector 30, and thus a barcode 52 in a range of 10 mm length×30 mm width in the first region 102 was formed.

It was confirmed that writing could be performed by carbonizing the spacer layer 105 of the second region 103 with the same laser beam. In the first region 102, adjustment of the output of the laser beam prevented carbonization of the spacer layer 105 in the portion from which the image forming reflector 30 had been removed, and prevented damage to the reflective scattering layer 10.

After the formation of the individual information record 50 and the information writing operation performed on the second region 103, the cards according to Examples 1 and 2 were formed.

In either embodiment, the barcode 52 was covered with the protective layer 40 and the reflective scattering layer 10, making physical access difficult, and counterfeiting or tampering difficult. Scanning the barcode 52 from the protective layer 40 side by a reader enables the information to be acquired from the barcode 52.

Figure 11A:
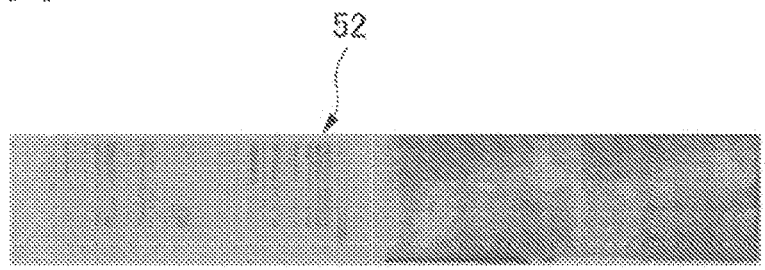
FIG. 11A is a photograph of an identifier according to an example of the present invention.
Figure 11B:
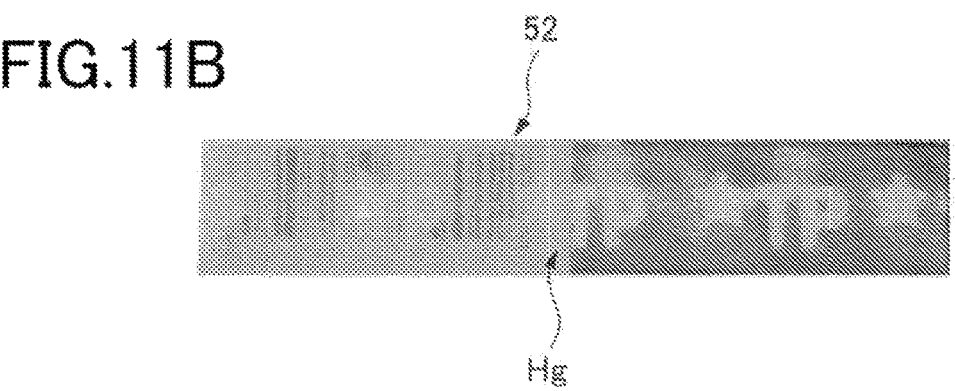
FIG. 11B is a photograph of the identifier of FIG. 11A irradiated with light in a predetermined manner.

Photographs of the barcode 52 in Example 2 are shown in FIGS. 11A and 11B. As shown in FIG. 11A, the barcode 52 is visible at all times and is machine readable. When this portion is irradiated with light in a predetermined manner, a hologram Hg based on the embossed layer 202 is displayed, as shown in FIG. 11B. The hologram Hg did not adversely affect the machine reading of the barcode 52.

The hologram Hg may be configured such that the hologram Hg can be observed within the range of the viewing angle θ, and the reconstruction image may be eliminated by the relief structure outside the range of the viewing angle θ. The barcode 52 can be visually recognized within and outside the range of the viewing angle θ of the hologram Hg, and can be read by the barcode reader.

As described above, Example 2 has shown that individual information record can be formed without impairing the optical effect of the transfer foil.

The embodiments and Examples of the present invention have so far been described in detail with reference to the drawings. However, specific configurations are not limited to these embodiments. The present invention should encompass modifications, combinations, or the like of these embodiments, in the range not departing from the spirit of the present invention.

Figure 12:
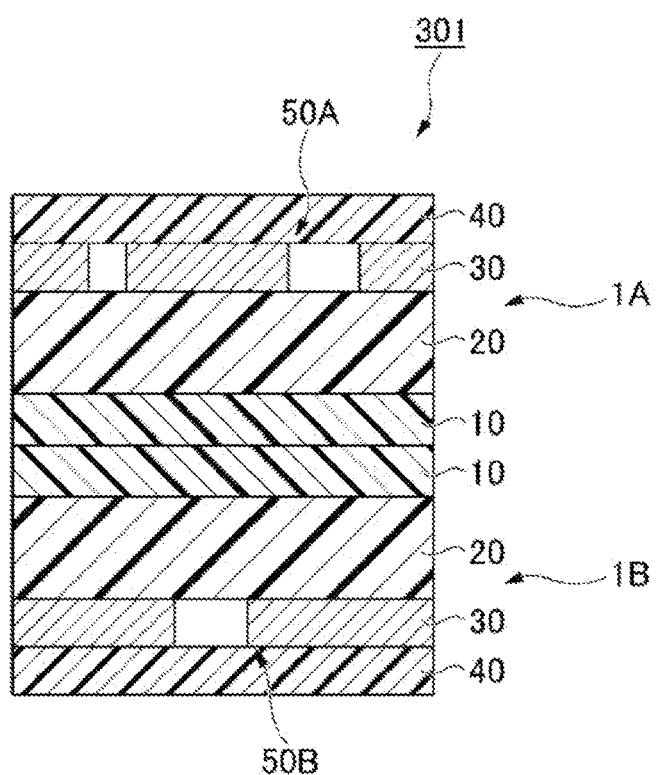
FIG. 12 is a cross-sectional view schematically illustrating an assembly of an optical assembly according to a modification of the present invention.

For example, as shown in FIG. 12, by joining the optical assemblies of the respective embodiments with the reflective scattering layers 10 facing each other, the optical assembly 301 having the individual information records 50A and 50B on both sides of the optical assembly 301 is formed. In FIG. 12, a first optical assembly 1A and a second optical assembly 1B having the same structure are joined, but optical assemblies having different structures may be joined as in the optical assembly of the first embodiment and the optical assembly of the second embodiment.

As another example, the optical assembly may be surface-bonded to both sides of the concealing scattering reflector. The concealing reflective scattering layer 10 conceals an image facing away from the observer. The reflective scattering layer 10 bonded to the optical assembly serves as a reflective scattering layer on both the front and back of the optical assembly.

The identifier of the present invention is not limited to the barcode 52 described above, and may be, for example, a two-dimensional code.

While the best mode for carrying out the present invention has been described with reference to the accompanying drawings, the scope of the present disclosure is not limited to the illustrated and described embodiments, but may include all embodiments that achieve the effects equivalent to those directed by the present invention. Further, the scope of the present disclosure is not limited to the features of the invention defined by the claims but includes all disclosed features and combinations of those features.

The terms "part", "element", "pixel", "cell", "segment", "unit", "display" or "article" used in the present disclosure represent physical entities. The physical entity may refer to a physical mode or a spatial mode surrounded by materials. The physical entity may be an assembly. The assembly may have a specific function. A combination of assemblies having a specific function can exhibit synergistic effects by a combination of the respective functions of the respective assemblies.

The terms used in the present disclosure and particularly in the appended claims (e.g., the text of the appended claims) are generally intended as "open" terms (e.g., the term "have" should be interpreted as "at least have", and the term "include" should be interpreted as "include, but are not limited to" or the like).

When understanding terms, configurations, features, aspects or embodiments, the drawings should be referred to as necessary. Matters that can be directly and unambiguously derived from the drawings should provide the basis of amendment as the text of the specification does.

If the introduction of a specific number in the claims is intended, such an intention will be clearly specified in the claims. If there is not such a specification, the intention does not exist. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such claim to embodiments containing only one such recitation. The introductory phrase "one or more" or "at least one" and the indefinite article "a" or "an" (e.g., "a" and/or "an") should be interpreted at least as "at least" ("one" or "one or more"). The same applies to the use of definite articles, which are used for introduction of claim recitation.

REFERENCE SIGNS LIST 1, 301 Optical assembly; 1A First optical assembly; 1B Second optical assembly 2 Pre-assembly; 10 Reflective scattering layer; 20, 105 Spacer layer; 30 Image forming reflector; 40 Protective layer; 50, 50A, 50B Individual information record (image information record); 52 Barcode; 101 Card (optical assembly); 102 First region; 103 Second region; 105a Information (laser mark); 200 Transfer foil; 202 Embossed layer; 203 Adhesive layer; R1 White level region; R2 Removed linear segment; RB Black level region.

What is claimed is:

1. An optical assembly, comprising:
   a spacer layer which is translucent or transparent;
   an image forming reflector which has a reflective layer, the reflective layer being formed at least in a first region of the spacer layer; and
   a protective layer which is laminated over the spacer layer and the image forming reflector, the protective layer being translucent or transparent, wherein
   the spacer layer is made of a polyolefin or/and a polymer containing an aryl group,
   the image forming reflector has a visible image formed therein, the visible image being authenticatable,
   the image forming reflector has an individual information record in which a code is stored in form of a plurality of removed linear segments, the removed linear segments being formed by removing parts of the reflective layer, and
   the image forming reflector has white level regions and a black level region in planar view of the image forming reflector, each of the white level regions having the removed linear segments formed therein, the black level region being interposed between the white level regions.

2. The optical assembly of claim 1, further comprising an embossed layer which is arranged between the image forming reflector and the protective layer or between the spacer layer and the image forming reflector, the embossed layer having a concavo-convex structure.

3. The optical assembly of claim 1, wherein the spacer layer is configured to be laser writable, the spacer layer, in planar view of the spacer layer, including
   the first region having a barcode formed thereon, and
   a second region having text or a facial image written thereon with a laser beam.

4. The optical assembly of claim 1, wherein the spacer layer has a first surface and a second surface, the first surface having the image forming reflector mounted thereon, the second surface being opposed to the first surface, and further comprising a reflective scattering layer which diffuses light incident thereto.

5. The optical assembly of claim 1, further comprising an adhesive layer formed over the image forming reflector, wherein
   the adhesive layer has a domain which has portions different in refractive indices from each other.

6. An optical assembly, comprising:
   a first optical assembly which has a structure identical to the optical assembly of claim 1; and
   a second optical assembly, wherein
   each of the first optical assembly and the second optical assembly has the spacer layer which has a first surface, and a second surface being opposed to the first surface, wherein
   the first surface of the first optical assembly has the image forming reflector of the first optical assembly mounted thereon, wherein
   the first surface of the second optical assembly has the image forming reflector of the second optical assembly mounted thereon, wherein
   each of the first optical assembly and the second optical assembly has a reflective scattering layer which diffuses light incident thereto, wherein
   the reflective scattering layer of the first optical assembly is mounted on the second surface of the first optical assembly, wherein the reflective scattering layer of the second optical assembly is mounted on the second surface of the second optical assembly, and wherein the reflective scattering layer of the first optical assembly and the reflective scattering layer of the second optical assembly are joined together.

7. A method of producing an optical assembly, comprising;

preparing a pre-assembly;

the pre-assembly comprising:

a reflective scattering layer which diffuses light incident thereto;

a spacer layer which is formed on the reflective scattering layer, the spacer layer being made of a polyolefin or/and a polymer containing an aryl group;

an image forming reflector which is formed at least in a first region of the spacer layer; and a protective layer which is laminated over the spacer layer and the image forming reflector, emitting a first laser beam onto the image forming reflector to remove portions of the image forming reflector in form of a plurality of removed linear segments which define an identifier including a machine-readable code; and emitting a second laser beam onto the spacer layer to laser mark the spacer layer, wherein the identifier has white level regions and a black level region in planar view of the identifier, each of the white level regions having the removed linear segments formed therein, the black level region being interposed between the white level regions, and wherein the image forming reflector includes a visible image which is authenticatable.

8. The method of producing an optical assembly of claim 7, wherein the first laser beam used for removing the image forming reflector and the second laser beam used for laser marking are identical.

9. The method of producing an optical assembly of claim 7, wherein a minimum intensity PL1 of the second laser beam for laser marking the spacer layer is greater than a minimum intensity PL2 of the first laser beam for removing the image forming reflector.

10. The optical assembly of claim 6, wherein the second optical assembly has a structure comprising:

a spacer layer which is translucent or transparent;

an image forming reflector which has a reflective layer, the reflective layer being formed at least in a first region of the spacer layer; and a protective layer which is laminated over the spacer layer and the image forming reflector, the protective layer being translucent or transparent, wherein the spacer layer is made of a polyolefin or/and a polymer containing an aryl group, the image forming reflector has a visible image formed therein, the visible image being authenticatable, the image forming reflector has an individual information record in which a code is stored in form of a plurality of removed linear segments, the removed linear segments being formed by removing parts of the reflective layer, and the image forming reflector has white level regions and a black level region in planar view of the image forming reflector, each of the white level regions having the removed linear segments formed therein, the black level region being interposed between the white level regions.

* * * * *